United States Patent
Choi et al.

(10) Patent No.: US 11,512,997 B2
(45) Date of Patent: Nov. 29, 2022

(54) FULL CHARGE NOTIFICATION DEVICE OF UREA WATER TANK FOR VEHICLE

(71) Applicants: Hyundai Motor Company, Seoul (KR); Kia Motors Corporation, Seoul (KR)

(72) Inventors: Seung Hoon Choi, Seoul (KR); June Young Park, Gyeonggi-do (KR); Jun Sik Lim, Gyeonggi-do (KR); Tae Yoon Lee, Seoul (KR); Sung Won Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 536 days.

(21) Appl. No.: 16/593,029

(22) Filed: Oct. 4, 2019

(65) Prior Publication Data
US 2020/0271506 A1    Aug. 27, 2020

(30) Foreign Application Priority Data
Feb. 25, 2019    (KR) .......................... 10-2019-0021890

(51) Int. Cl.
*G01F 23/74*    (2006.01)
*B60K 13/04*    (2006.01)
*B60K 15/077*    (2006.01)
*B60K 15/03*    (2006.01)

(52) U.S. Cl.
CPC .............. *G01F 23/74* (2013.01); *B60K 13/04* (2013.01); *B60K 2015/03361* (2013.01); *B60K 2015/03368* (2013.01); *B60K 2015/0772* (2013.01); *F01N 2610/02* (2013.01)

(58) Field of Classification Search
CPC .................................................. G01F 23/0015
See application file for complete search history.

(56) References Cited

U.S. PATENT DOCUMENTS

| | | | | |
|---|---|---|---|---|
| 5,023,608 | A * | 6/1991 | Delisle, Jr. .......... | G01F 23/0015 340/984 |
| 5,555,905 | A * | 9/1996 | Mifune ................... | G01F 23/60 137/15.01 |
| 6,000,359 | A * | 12/1999 | Hudson, Jr. .......... | G01F 23/0015 116/109 |
| 7,053,782 | B2 * | 5/2006 | Takashima .............. | G01F 23/74 340/687 |
| 2002/0121982 | A1 * | 9/2002 | Ferris ................... | G01F 23/0015 340/603 |
| 2003/0140841 | A1 * | 7/2003 | Hawkins ............... | G01F 23/0015 116/109 |

(Continued)

FOREIGN PATENT DOCUMENTS

| | | | | |
|---|---|---|---|---|
| JP | 61018826 | A * | 1/1986 | ......... G01F 23/0015 |
| JP | H07-096886 | A | 4/1995 | |

(Continued)

*Primary Examiner* — Paul M. West
*Assistant Examiner* — Mark A Shabman
(74) *Attorney, Agent, or Firm* — Fox Rothschild LLP

(57) ABSTRACT

A full charge notification device of a urea water tank for a vehicle is provided. The device is configured to generate a predetermined sound when urea water is normally injected into the urea water tank before a full state, to provide a notification to a user of a full state of the urea water tank through non-generation of the sound.

7 Claims, 4 Drawing Sheets

(56) References Cited

U.S. PATENT DOCUMENTS

| | | | | |
|---|---|---|---|---|
| 2007/0017559 A1* | 1/2007 | Yamaguchi | ............ | B60S 1/481 |
| | | | | 134/123 |
| 2013/0118252 A1* | 5/2013 | Hartmann | ........... | G01F 23/2962 |
| | | | | 73/290 V |
| 2013/0160433 A1* | 6/2013 | Schepers | ................. | G01F 23/00 |
| | | | | 73/290 V |
| 2015/0159531 A1* | 6/2015 | Ryoo | ............... | B60K 15/03504 |
| | | | | 137/199 |
| 2015/0167529 A1* | 6/2015 | Lee | ........................ | B60K 15/01 |
| | | | | 60/295 |
| 2015/0290586 A1* | 10/2015 | Ham | ..................... | B01D 45/12 |
| | | | | 96/155 |

FOREIGN PATENT DOCUMENTS

| JP | 2012122784 A | 6/2012 |
|---|---|---|
| KR | 10-0166307 | 12/1998 |

\* cited by examiner

FULL CHARGE NOTIFICATION DEVICE OF UREA WATER TANK FOR VEHICLE

CROSS REFERENCE TO RELATED APPLICATION

The present application claims priority to Korean Patent Application No. 10-2019-0021890, filed Feb. 25, 2019, the entire contents of which is incorporated herein for all purposes by this reference.

BACKGROUND

Field of the Invention

The present invention relates to a full charge notification device of a urea water tank for a vehicle and, more particularly, to a full charge notification device of a urea water tank for a vehicle that notifies a user of when the urea water tank is fully charged with urea water.

Description of the Related Art

Generally, when a vehicle equipped with a diesel engine, a urea water tank is provided to store urea water used to remove nitrogen oxides contained in the engine exhaust gas. In particular, a urea water injection gun or a commercially available urea water container is used to inject the urea water into the urea water tank. When the urea water injection gun is used to inject urea water, the urea water injection gun is inserted into an injection pipe of the urea water tank, and the urea water injection gun automatically injects urea water when the injection gun is operated. When the urea water tank is fully charged with the urea water, the urea water injection gun is automatically stopped by an injection stop device provided in the urea water injection gun, thus, injection of the urea water is stopped.

When the urea water container is used to inject the urea water, a nozzle of the urea water container is inserted into an inlet of the injection pipe of the urea water tank, and injects the urea water of the urea water container into the urea water tank. Since a user is unable to determine a full state of the urea water tank, the user estimates the full state of the urea water tank by feeling and stopping the injection of the urea water by prediction. However, such an estimate is not generally accurate.

Therefore, in the conventional case, when the urea water is injected into the urea water tank using the urea water container, it is difficult for the user to determine whether the urea water tank is fully charged with urea water. Thus, the urea water is further injected into the urea water tank even after the urea water tank is fully charged, and the urea water is excessively injected into the inlet of the injection pipe of the urea water tank until the urea water flows back and overflows, which are problematic.

SUMMARY

Accordingly, the present invention provides a full charge notification device of a urea water tank for a vehicle configured to generate a predetermined sound when urea water is normally injected into the urea water tank before a full state and to notify a user of a state of the urea water tank fully charged with the urea water through non-generation of the sound.

According to one aspect of the present invention, a full charge notification device of a urea water tank for a vehicle may include: a urea water tank having a urea water injection pipe for injecting urea water; a leveling pipe provided at an upper part of the urea water tank to discharge air inside the urea water tank to an outside of the urea water tank when urea water is injected into the urea water tank through the urea water injection pipe; and a sound generator provided in the leveling pipe and configured to generate sound by a flow of air passing through the leveling pipe.

The sound generator may be configured to generate no sound when urea water filling up the urea water tank blocks a lower end of leveling pipe provided in the urea water tank. Specifically, the sound generator may include: a hollow sound plate housing provided in the leveling pipe; a sound plate supporter having an open aperture for flowing air at a center thereof and provided in the sound plate housing; and a pair of sound plates mounted on the sound plate supporter and hitting or contacting each other repeatedly by the flow of air passing through the open aperture. An outer circumferential surface of the sound plate housing may be in abutting contact with an inner circumferential surface of the leveling pipe, and the sound plate supporter may be configured to block the flow of air passing through an inside of the sound plate housing except the open aperture.

According to an exemplary embodiment of the present invention, the pair of sound plates may include: a first sound plate having a first contact part; and a second sound plate having a second contact part disposed to be in contact with the first contact part. The first sound plate may include a first joint fixed to the sound plate supporter and a first elastic deformation part disposed between the first joint and the first contact part, the second sound plate may include a second joint fixed to the sound plate supporter and a second elastic deformation part disposed between the second joint and the second contact part. When the first contact part and the second contact part are separated from each other by air passing through the open aperture, the first elastic deformation part and the second elastic deformation part may be elastically bent and generate elastic restoring force.

When load caused by a flow rate of air passing through the open aperture is equal to or less than elastic restoring force of the first sound plate and the second sound plate, the first contact part and the second contact part may be restored to original positions and hit or contact each other. In addition, when the first contact part and the second contact part are in contact with each other, a gap may be formed between the first elastic deformation part, the second elastic deformation part, and the sound plate supporter to allow air to pass therethrough.

According to the full charge notification device of the urea water tank for the vehicle of the present invention, when urea water is injected into the urea water tank using the urea water container, a user may distinguish between 'a underfilled state' and 'a full state' of the urea water tank based on whether the sound is generated. Therefore, during injection of urea water into the urea water tank, the user may recognize a time when a height of the urea water injected in the urea water tank reaches a pre-set full height (e.g., an upper limit height). Consequently, the user may stop injection of the urea water before the urea water injected into the urea water tank flows back into the urea water injection pipe and overflows into the inlet of the urea water injection pipe.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
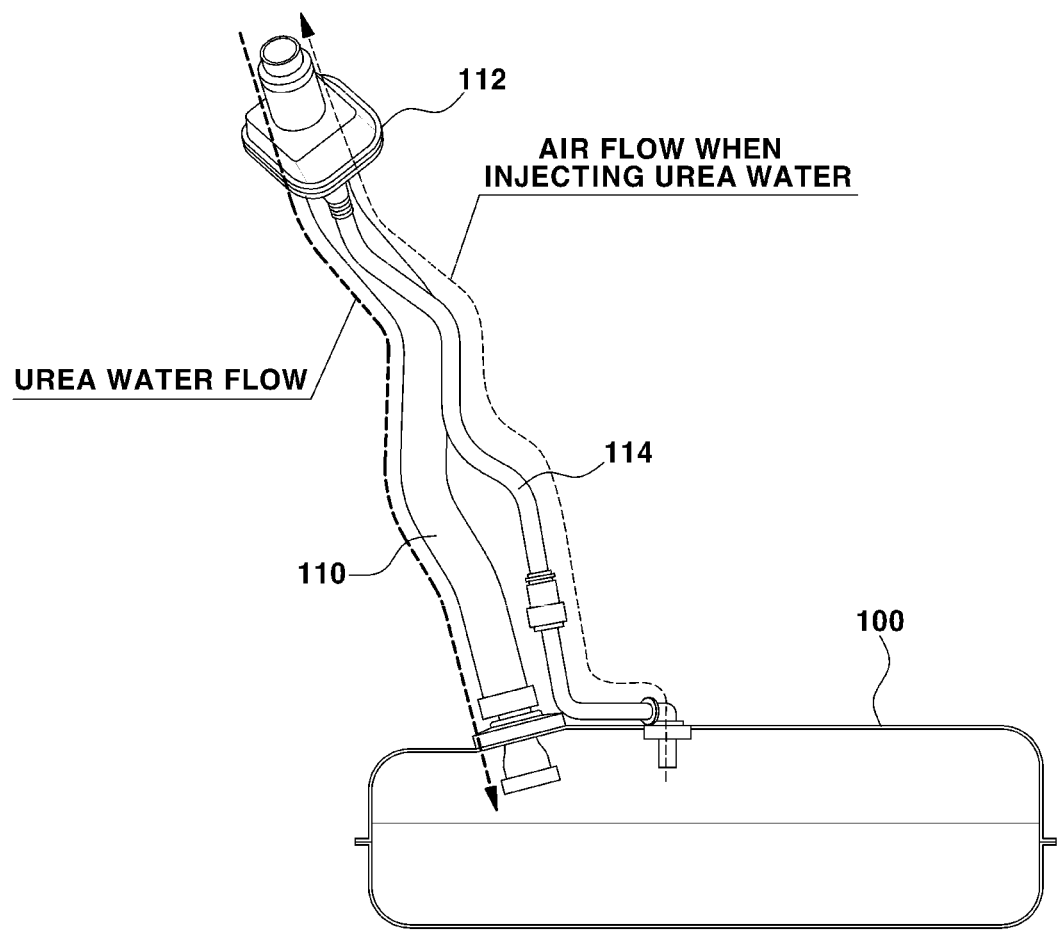
FIG. 1 is a view showing a leveling pipe in which a full charge notification device of a urea water tank is installed according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, an exemplary embodiment of the present invention will be described such that the invention may be easily embodied by those skilled in the art to which this invention belongs.

A full charge notification device of a urea water tank for a vehicle according to the present invention is configured as follows: when urea water is manually injected into the urea water tank, the full charge notification device may be configured to output a notification to a user of a full state of the urea water tank without using an electronic equipment such as a sensor configured to sense a water level of the urea water. The full charge notification device of the urea water tank may be configured to generate a predetermined sound when urea water is injected into the urea water tank before a full state. When the urea water tank is fully charged, even when the urea water is further injected into the urea water tank, the full charge notification device does not generate the sound.

The full charge notification device of the urea water tank may be configured to generate the predetermined sound (e.g., a sound of thin plates hitting or contacting (e.g., vibrating against each other) each other) when urea water in a urea water container is injected directly into the urea water tank by a manual manner of pouring into a urea water injection pipe, and may be configured to stop generating sound to provide a notification regarding the full state of the urea water tank. In other words, when urea water is injected into the urea water tank using the urea water container without a separate device for automatically stopping injection of urea water, the full charge notification device may be configured to generate the predetermined sound before a height of the urea water in the urea water tank reaches a pre-set full height (in other words, an upper limit height). When the height of the urea water inside the urea water tank reaches the upper limit height as the urea water is injected into the urea water tank, the full charge notification device may be configured to stop the generation of the predetermined sound.

Figure 2:
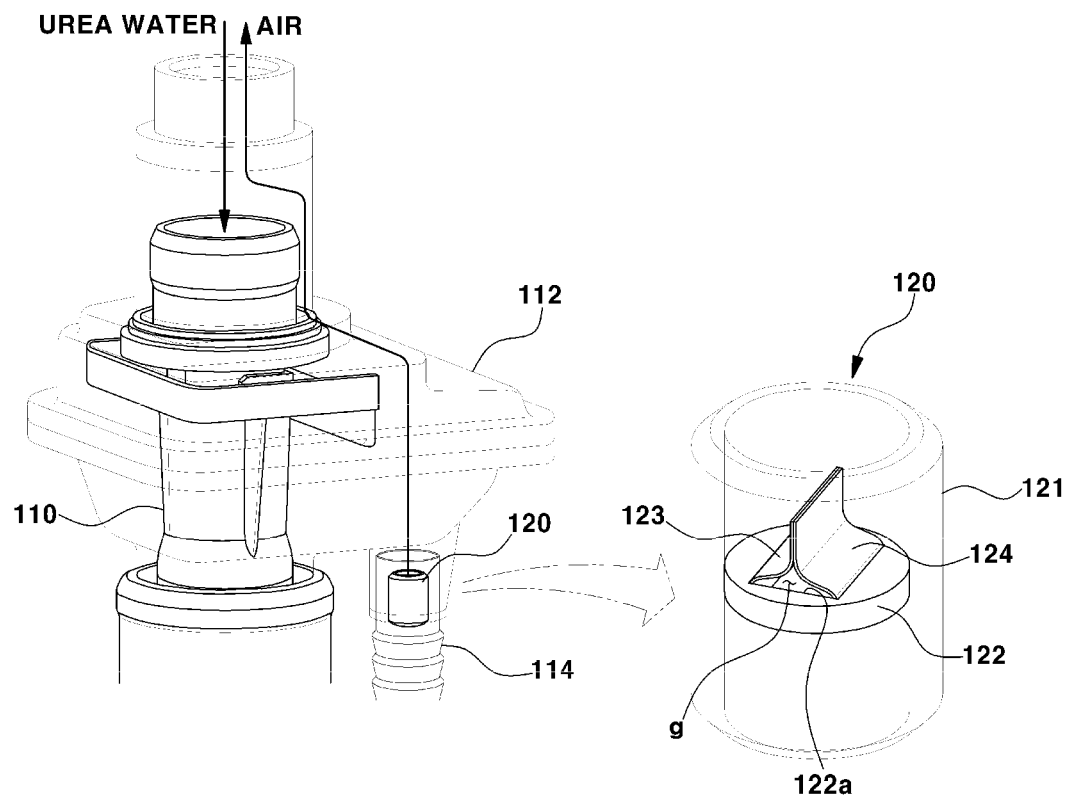
FIG. 2 is a view showing a sound generator installed in an upper part of the leveling pipe according to an exemplary embodiment of the present invention.

As shown in FIGS. 1 and 2, the full charge notification device of the urea water tank may include the urea water tank 100, a leveling pipe 114, and a sound generator 120. The urea water tank 100 may be disposed within the vehicle to store urea water used to remove nitrogen oxides contained in exhaust gas of a diesel engine. The urea water tank 100 may include a urea water injection pipe 110 through which urea water may be injected and may include the leveling pipe 114 for discharging air inside the urea water tank 100 to the outside (e.g., the atmosphere) of the urea water tank 100 when the urea water is injected into the urea water tank 100 through the urea water injection pipe 110.

The urea water injection pipe 110 may be disposed with a lower part thereof in communication with an upper part of the urea water tank 100, and an upper part thereof may include an atmospheric communication part 112 in communication with the atmosphere outside the vehicle. The atmospheric communication part 112 may be formed of an upper part and a lower part. The upper part thereof may be formed into a pipe form surrounding an upper part of the urea water injection pipe 110, and the lower part thereof may be formed into a box form and be connected to an upper part of the leveling pipe 114. The urea water injection pipe 110 may guide a flow of urea water injected from the outside of the vehicle into the urea water tank 100 using the urea water container.

The leveling pipe 114 may include a lower part thereof disposed to communicate with the upper part of the urea water tank 100, and an upper part thereof disposed to discharge inside air of the urea water tank 100 to the atmosphere. The upper part of the leveling pipe 114 may be fixed at and supported by the lower part of the atmospheric communication part 112. The lower part of the leveling pipe 114 may pass through the upper part of the urea water tank 100 and be disposed inside the urea water tank 100. The leveling pipe 114 may be configured to discharge the inside air of the urea water tank 100 to the outside before an end of the leveling pipe 114 (e.g., a lower end of the leveling pipe 114) is blocked by the water level of the urea water. In other words, when the lower end of the leveling pipe 114 is closed by the water level of the urea water, it may be difficult to discharge the inside air of the urea water tank 100 to the outside through the leveling pipe 114. Accordingly, the lower end of the leveling pipe 114 may be disposed at the upper limit height of urea water in the urea water tank 100. In other words, a full height of the urea water filling the urea water tank 100 is the same as a height of the lower end of the leveling pipe 114 disposed inside the urea water tank 100.

Figure 3:
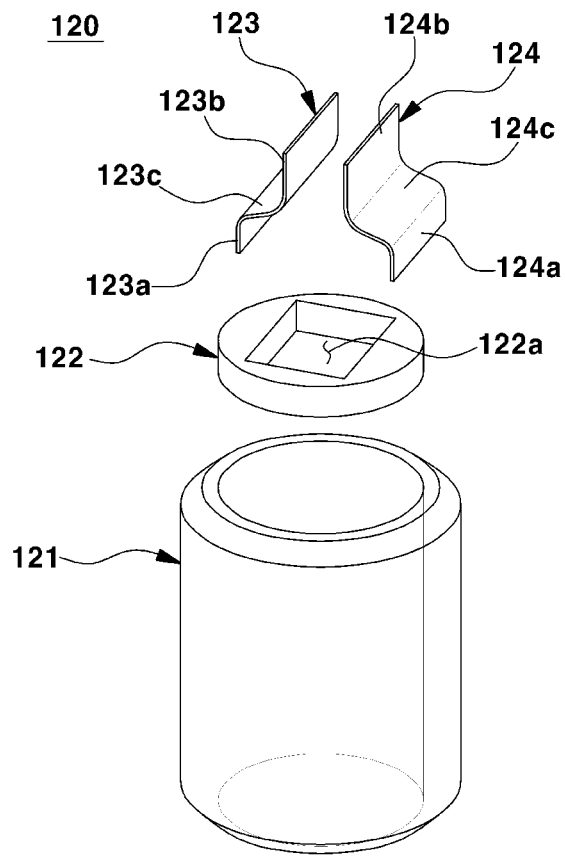
FIG. 3 is a detailed perspective view showing the sound generator according to an exemplary embodiment of the present invention.
Figure 4:
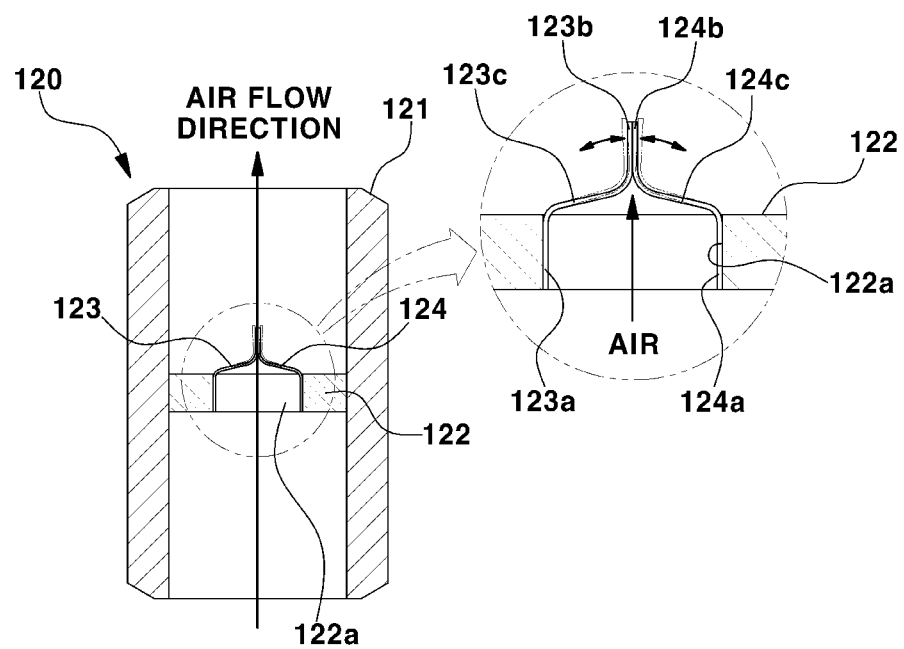
FIG. 4 is a cross-sectional view showing the sound generator according to an exemplary embodiment of the present invention.

As shown in FIGS. 2 to 4, the sound generator 120 may be configured to generate the predetermined sound when the urea water tank 100 is filled with urea water. The sound generator 120 may be disposed inside the leveling pipe 114 and operated by a flow and an flow rate of air passing through the leveling pipe 114 and discharged to the outside of the urea water tank 100. Specifically, the sound generator 120 may include a sound plate housing 121 disposed inside the leveling pipe 114, a sound plate supporter 122 disposed inside the sound plate housing 121, and a pair of sound plates 123 and 124 mounted on the sound plate supporter 122.

The sound plate housing 121 allows the sound generator 120 to be mounted more easily in the leveling pipe 114, and the sound plate housing 121 may be pressed in the leveling pipe 114 and fixed to an inner circumferential surface of the leveling pipe 114. In particular, an outer circumferential surface of the sound plate housing 121 may abut the inner circumferential surface of the leveling pipe 114. The sound plate housing 121 may be formed into a form of a pipe having an inner diameter less than an inner diameter of the leveling pipe 114 by at least a predetermined value. In other words, the sound plate housing 121 may have a thickness that corresponds to a value obtained by subtracting an inner diameter of the sound plate housing 121 from the inner diameter of the leveling pipe 114.

The sound plate housing 121 may have the inner diameter less than the inner diameter of the leveling pipe 114, thereby increasing the flow rate and flow pressure of air passing through the sound plate housing 121. All air discharged through the leveling pipe 114 to the outside of the urea water tank 100 (that is, the atmosphere) may pass through the inside of the sound plate housing 121. The sound plate housing 121 may be formed into a hollow cylinder having a predetermined length based on a direction of the air flow passing through the leveling pipe 114. As another example, the sound plate housing 121 may be formed into a hollow octagonal form or another polygonal form.

The sound plate supporter 122 may be pressed in the sound plate housing 121 and be fixed to an inner circumferential surface of the sound plate housing 121. The sound plate supporter 122 may be formed into a form of a plate on which an open aperture 122a for air flow is provided at a center thereof. An outer circumferential surface of the sound plate supporter 122 may abut the inner circumferential surface of the sound plate housing 121. Accordingly, the air passing through the sound plate housing 121 may be prevented from flowing between the sound plate supporter 122 and the sound plate housing 121, and may flow through only the open aperture 122a In other words, the air passing through the sound plate housing 121 may pass through the open aperture 122a. The sound plate supporter 122 may block the air flow passing through the sound plate housing 121 except the open aperture 122a. The open aperture 122a may be formed into a square shape, but is not limited thereto.

The pair of sound plates 123 and 124 are a first sound plate 123 and a second sound plate 124 mounted on an inner circumferential surface of the sound plate supporter 122, respectively. The pair of sound plates 123 and 124 may be installed as follows: an upper part (e.g., the first contact part) of the first sound plate 123 and an upper part (e.g., a second contact part) of the second sound plate 124 may be in contact with each other (e.g., abutting contact) while facing each other, and a lower part (e.g., a first joint) of the first sound plate 123 and a lower part (e.g., a second joint) of the second sound plate 124 may be installed in the inside of the sound plate supporter 122 and disposed at the open aperture 122a. The pair of sound plates 123 and 124 may be operated such that the upper parts of the first sound plate 123 and the second sound plate 124 are spaced apart from each other due to a load caused by the flow rate of the air passing through the open aperture 122a.

In the pair of sound plates 123 and 124, when the load caused by the flow rate of the air passing through the open aperture 122a is equal to or less than elastic restoring force of the sound plates 123 and 124, the upper parts of the first sound plate 123 and the second sound plate 124 may be restored to original positions and hit each other. The first joint 123a and the second joint 124a may be fixed to the inner circumferential surface of the sound plate supporter 122 (e.g., an inner circumferential surface surrounding the open aperture) while the first contact part 123b and the second contact part 124b are in contact with each other while facing each other. For example, the first joint 123a and the second joint 124a may be attached at the inner circumferential surface of the sound plate supporter 122 by welding. Particularly, the first joint 123a and the second joint 124a may be disposed to face each other at both edges of the open aperture 122a.

A first elastic deformation part 123c may be formed integrally between the first joint 123a and the first contact part 123b, and a second elastic deformation part 124c may be formed integrally between the second joint 124a and the second contact part 124b. The first elastic deformation part 123c and the second elastic deformation part 124c may be elastically bent and be deformed by the load caused by the air flow passing through the open aperture 122a When the first contact part 123b and the second contact part 124b are separated from each other by the air passing through the open aperture 122a, the first elastic deformation part 123c and the second elastic deformation part 124c may be bent elastically. In particular, the first elastic deformation part 123c and the second elastic deformation part 124c may be bent toward the outside of the sound plate supporter 122.

However, when the elastic restoring force generated at the time of deformation is greater than the load caused by the air flow passing through the open aperture 122a, the first elastic deformation part 123c and the second elastic deformation part 124c allow the first contact part 123b and the second contact part 124b to be restored to original positions. The first contact part 123b and the second contact part 124b hit each other when being restored to original positions, and may be configured to generate the sound based on the contact against each other. When the first contact part 123b and the second contact part 124b are separated from each other, the flow rate of the air passing through the sound plate housing 121 may be changed. Therefore, while the air entering the leveling pipe 114 passes through the sound plate housing 121, the first contact part 123*b* and the second contact part 124*b* may be repeatedly attached and detached to each other (e.g., a vibrating contact against each other) and generate the sound continuously.

When the urea water tank 100 is filled with urea water using the urea water container, a flow rate of urea water injected into the urea water tank 100 may be changed based on an amount of urea water in the urea water container. In addition, the flow rate of the air passing through the leveling pipe 114 and the sound plate housing 121 may be changed based on the flow rate of the urea water. The first sound plate 123 and the second sound plate 124 may be formed of a plastic material having elasticity. The first sound plate 123 and the second sound plate 124 may be formed into a film form so that portions between joints 123*a* and 124*a* and elastic deformation parts 123*c* and 124*c* and between elastic deformation parts 123*c* and 124*c* and contact parts 123*b* and 124*b* may be bent. The first sound plate 123 and the second sound plate 124 may be formed of the film form material to allow the first and second contact parts 123*b* and 124*b* to generate the sound of a level that the user may hear when hitting each other.

Figure 5:
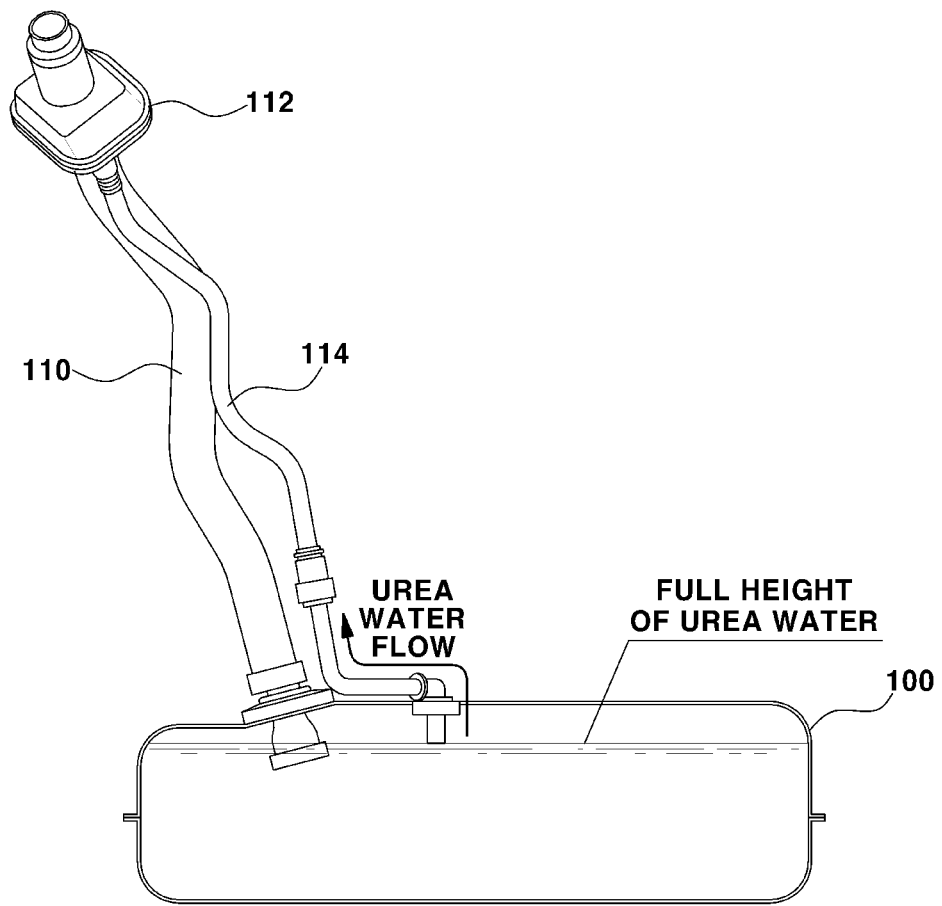
FIG. 5 is a view showing a full state of the urea water tank according to an exemplary embodiment of the present invention.

Although not shown in the accompanying drawings, the first sound plate 123 and the second sound plate 124 may not have a gap formed between the elastic deformation parts 123*c* and 124*c* and the sound plate supporter 122 when the first contact part 123*b* and the second contact part 124*b* are in contact with each other. Otherwise, the first sound plate 123 and the second sound plate 124 may have a small gap g formed between the elastic deformation parts 123*c* and 124*c* and the sound plate supporter 122 when the first contact part 123*b* and the second contact part 124*b* are in contact with each other (referring to FIG. 2). When the urea water fills up the leveling pipe 114 by hydraulic pressure of urea water in the urea water tank 100, the gap g may completely prevent the first contact part 123*b* and the second contact part 124*b* from being separated and spaced apart from each other by the flow of air remaining in the leveling pipe 114 (referring to FIG. 5).

The sound generator 120 configured as described above may provide a notification to the user of an under-filled state and a full state of the urea water tank 100, based on whether the sound is generated when the first contact part 123*b* and the second contact part 124*b* hit each other. In other words, the user may detect the under-filled state, in which the height of urea water of the urea water tank 100 does not reach the upper limit height, through the sound generated when the first contact part 123*b* and the second contact part 124*b* heat each other. When the sound is not generated for a predetermined time, the user may determine the full state in which the height of the urea water in the urea water tank 100 is equal to or greater than the upper limit height. Accordingly, to notify the user of the under-filled state and the full state of the urea water tank 100 more accurately, the sound generator 120 may be disposed at the upper part of the leveling pipe 114 connected to the atmospheric communication part 112.

In the full charge notification device of the urea water tank configured as described above, when a nozzle of the urea water container is slotted in the upper part of the urea water injection pipe 110 to inject urea water in the urea water tank, the full charge notification device may be configured to provide a notification to the user of the full state of the urea water tank 100 using only the sound generator 120, without using the separate electronic equipment configured to sense the full state of the urea water tank 100. In other words, the claimed invention is capable of omitted additionally provided sensors. Thus, the user may detect the full state of the urea water tank 100 and stop the injection of the urea water when no sound is generated from the sound generator 120, to prevent the urea water from being injected excessively into the urea water tank 100, and to prevent the urea water from flowing back into the urea water injection pipe 110 due to the excessive injection of the urea water.

Generally, when urea water is injected into the urea water injection pipe until the height of the urea water in the urea water tank is greater than the upper limit height, the urea water may flow along the urea water injection pipe and into the urea water tank. Depending on amount of the urea water flowing into the urea water tank, the inside air of the urea water tank may be discharged to the atmosphere through the leveling pipe. When the urea water fills to the height of the lower end of the leveling pipe in the urea water tank, the lower end of the leveling pipe may be blocked by a water level of the urea water, and thus, the inside air of the urea water tank may be prevented from being discharged to the atmosphere through the leveling pipe. When urea water is injected into the urea water tank even after the lower end of the leveling pipe is blocked by the urea water in the urea water tank, the urea water fills up the leveling pipe by the hydraulic pressure of the urea water in the urea water tank. Thus, when urea water is further injected after the urea water begins to fill up the leveling pipe, the urea water flows back into the urea water injection pipe and overflows.

However, in the full charge notification device of the urea water tank according to the present invention, as the sound generated from the sound generator 120 is stopped, the user may detect the full state of the urea water tank 100. Accordingly, it may be possible to prevent urea water from being further injected into the urea water tank 100 after the urea water tank 100 is fully charged.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A full charge notification device of a urea water tank for a vehicle, comprising:
   a urea water tank including a urea water injection pipe for injecting urea water into the urea water tank;
   a leveling pipe disposed at an upper part of the urea water tank to discharge air inside the urea water tank to an outside of the urea water tank when urea water is injected into the urea water tank through the urea water injection pipe; and
   a sound generator disposed in the leveling pipe and configured to generate sound by a flow of air passing through the leveling pipe;
   wherein the sound generator includes:
      a hollow sound plate housing disposed in the leveling pipe;
      a sound plate supporter having an open aperture formed in a center thereof, through which air can flow, and disposed in the sound plate housing; and
      a pair of sound plates mounted on the sound plate supporter and vibrating against each other repeatedly by the flow of air passing through the open aperture,
   wherein the pair of sound plates includes:
      a first sound plate having a first contact part; and
      a second sound plate having a second contact part disposed to be in contact with the first contact part, wherein the first sound plate includes a first joint fixed to the sound plate supporter and a first elastic deformation part disposed between the first join and the first contact part, wherein the second sound plate includes a second joint fixed to the sound plate supporter and a second elastic deformation part disposed between the second joint and the second contact part, wherein when the first contact part and the second contact part are separated from each other by air passing through the open aperture, the first elastic deformation part and the second elastic deformation part are elastically bent; and wherein, when the first contact part and the second contact part are in contact with each other, a gap is formed between the first elastic deformation part, the second elastic deformation part, and the sound plate supporter to allow air to pass therethrough.

2. The full charge notification device of claim 1, wherein the sound generator is configured to generate no sound when urea water filling up the urea water tank blocks a lower end of leveling pipe provided in the urea water tank.

3. The full charge notification device of claim 1, wherein an outer circumferential surface of the sound plate housing is in abutting contact with an inner circumferential surface of the leveling pipe, and the sound plate supporter is configured to block the flow of air passing through an inside of the sound plate housing except the open aperture.

4. The full charge notification device of claim 1, wherein the sound plate housing has an inner diameter less than an inner diameter of the leveling pipe by at least a predetermined value.

5. The full charge notification device of claim 1, wherein, when load caused by a flow rate of air passing through the open aperture is equal to or less than elastic restoring force of the first sound plate and the second sound plate, the first contact part and the second contact part are restored to original positions and vibrate against each other.

6. The full charge notification device of claim 1, wherein the sound generator is disposed at an upper part of the leveling pipe.

7. The full charge notification device of claim 1, wherein an upper limit height of urea water filling up the urea water tank is a height of a lower end of the leveling pipe disposed in the urea water tank.

\* \* \* \* \*